(12) United States Patent
Fujita et al.

(10) Patent No.: US 11,359,740 B2
(45) Date of Patent: Jun. 14, 2022

(54) ELECTROMAGNETIC VALVE

(71) Applicant: JTEKT CORPORATION, Osaka (JP)

(72) Inventors: Kaori Fujita, Kariya (JP); Toshihiko Shima, Okazaki (JP); Teppei Morita, Okazaki (JP); Toshio Murakami, Nagoya (JP); Shungo Kamigaichi, Nagoya (JP); Tomohiro Shiromaru, Takahama (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/939,113

(22) Filed: Jul. 27, 2020

(65) Prior Publication Data
US 2021/0033210 A1 Feb. 4, 2021

(30) Foreign Application Priority Data

Aug. 2, 2019 (JP) .............................. JP2019-143175

(51) Int. Cl.
*F16K 31/06* (2006.01)
*F16K 11/07* (2006.01)

(52) U.S. Cl.
CPC .......... *F16K 31/0613* (2013.01); *F16K 11/07* (2013.01)

(58) Field of Classification Search
CPC .. F16K 31/0613; F16K 11/07; F16K 11/0708; F16K 27/041
USPC ...................................................... 137/596.2
See application file for complete search history.

(56) References Cited

U.S. PATENT DOCUMENTS

| | | | |
|---|---|---|---|
| 6,397,890 B1 * | 6/2002 | Mickelson | F15B 13/0402 |
| | | | 137/625.34 |
| 6,453,947 B1 | 9/2002 | Inoue et al. | |
| 7,434,652 B2 * | 10/2008 | Miyazaki | B62D 5/083 |
| | | | 180/403 |
| 7,921,878 B2 * | 4/2011 | Coolidge | F15B 13/0417 |
| | | | 137/625.68 |
| 9,689,500 B2 * | 6/2017 | Coolidge | F16K 11/0708 |
| 2006/0169520 A1 * | 8/2006 | Miyazaki | B62D 5/083 |
| | | | 180/417 |
| 2008/0257142 A1 * | 10/2008 | Matsuzaki | F15B 13/0417 |
| | | | 91/446 |
| 2009/0230337 A1 * | 9/2009 | Hoppe | F16K 31/0613 |
| | | | 251/62 |

(Continued)

FOREIGN PATENT DOCUMENTS

| | | | | |
|---|---|---|---|---|
| JP | 2001-263529 A | 9/2001 | | |
| JP | 2009-197848 A | 9/2009 | | |
| WO | WO-2019138612 A1 * | 7/2019 | ............. | F16K 11/07 |

*Primary Examiner* — Daphne M Barry
(74) *Attorney, Agent, or Firm* — Oblon, McClelland, Maier & Neustadt, L.L.P.

(57) ABSTRACT

An electromagnetic valve includes a sleeve having a valve hole at a central portion thereof, a spool, and an electromagnetic solenoid. The sleeve has plural ports penetrating the sleeve between inner and outer peripheral surfaces thereof and disposed side by side in a central axis direction of the valve hole. In the spool, plural lands having an outer peripheral surface facing an inner peripheral surface of the valve hole are provided side by side in the central axis direction. The electromagnetic solenoid is configured to move the spool in the central axis direction in the valve hole. The ports have one or plural recessed portions in which working oil is stored. When the spool is decentered with respect to the sleeve, a pressure of the working oil stored is increased.

4 Claims, 5 Drawing Sheets

(56) References Cited

U.S. PATENT DOCUMENTS

| | | | |
|---|---|---|---|
| 2015/0059899 A1* | 3/2015 | Mukaide | F16K 31/0613 137/625.65 |
| 2015/0362084 A1* | 12/2015 | Coolidge | F15B 13/0402 137/625.48 |
| 2020/0096121 A1* | 3/2020 | Kojima | F15B 13/0426 |

* cited by examiner

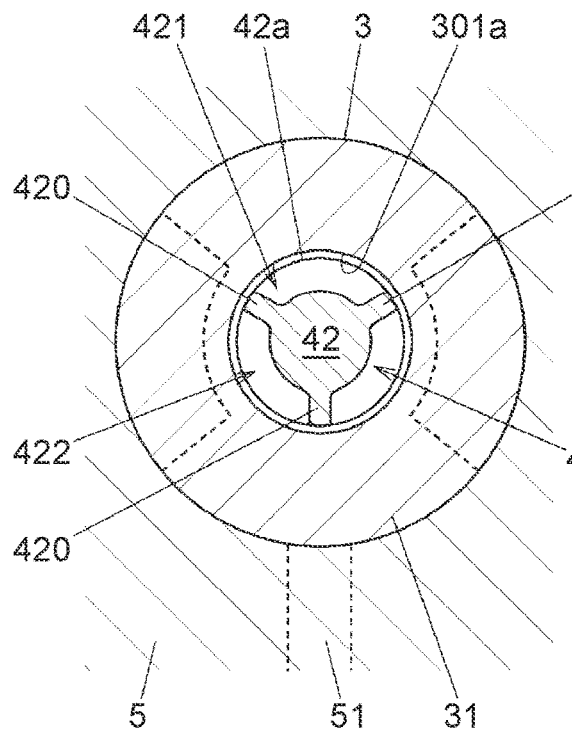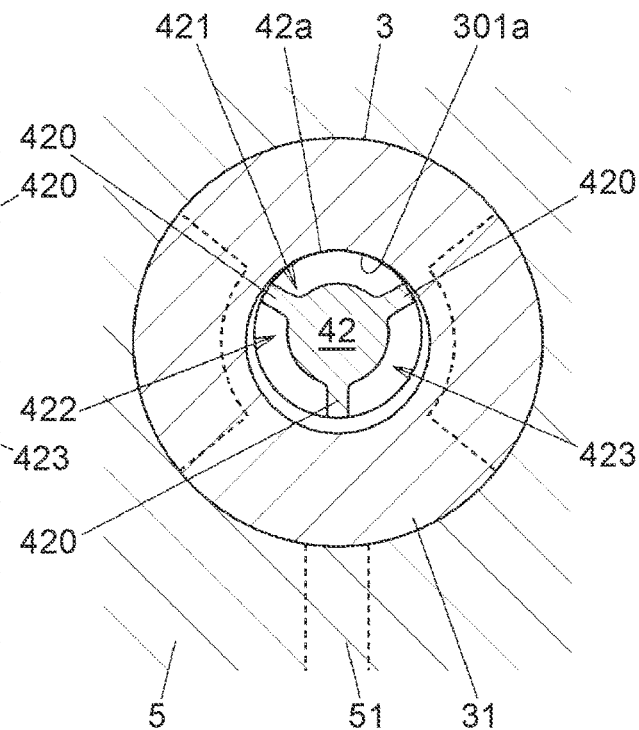

ELECTROMAGNETIC VALVE

CROSS-REFERENCE TO RELATED APPLICATION

This application claims priority to Japanese Patent Application No. 2019-143175 filed on Aug. 2, 2019, incorporated herein by reference in its entirety.

BACKGROUND

1. Technical Field

The present disclosure relates to an electromagnetic valve.

2. Description of Related Art

An electromagnetic valve that includes a tubular sleeve in which a plurality of ports are formed side by side in the central axis direction of a valve hole, a spool in which a plurality of lands are formed side by side in the axial direction to allow and block communication between the plurality of ports, and an electromagnetic solenoid that moves the spool in the valve hole of the sleeve is used to control a hydraulic actuator, for example.

Japanese Unexamined Patent Application Publication No. 2001-263529 (JP 2001-263529 A) describes an electromagnetic valve in which a plurality of alignment grooves is formed in the inner peripheral surface of a sleeve (housing), which faces the outer peripheral surfaces of lands, in order to allow a spool (spool valve) to move smoothly with respect to the sleeve in accordance with a current supplied to an electromagnetic solenoid. Meanwhile, Japanese Unexamined Patent Application Publication No. 2009-197848 (JP 2009-197848 A) describes an electromagnetic valve in which the inner peripheral surface of a valve hole between a plurality of ports is formed to be tapered such that the inside diameter becomes smaller from a port on the high pressure side toward a portion on the low pressure side, in order to reduce a sliding resistance that acts on the spool.

SUMMARY

In an electromagnetic valve that is used to control a hydraulic actuator of a transmission of an automobile, for example, communication between a supply port, to which working oil is supplied from a hydraulic pump, and a different port is occasionally blocked by a land over a long time (e.g. five minutes or more) when the automobile is stationary etc. In such a case, the spool is decentered with respect to the sleeve by the pressure of the working oil which is supplied from the hydraulic pump, and a part of the outer peripheral surface of the land in the circumferential direction is pressed against the inner peripheral surface of the valve hole, which may cause a sticking phenomenon at the location of this abutment. When such a sticking phenomenon occurs, a stick-slip phenomenon tends to be caused with the spool not starting to move smoothly when the spool is moved in the axial direction by varying a current supplied to the electromagnetic solenoid.

In the electromagnetic valve described in JP 2001-263529 A, in which the plurality of alignment grooves is formed in the inner peripheral surface of the sleeve to smooth movement of the sleeve, the surface pressure at the location of the abutment at which the outer peripheral surface of the land is pressed against the inner peripheral surface of the valve hole is increased because of the formation of the alignment grooves. Thus, the occurrence of the stick-slip phenomenon may not necessarily be inhibited in the case where the spool is moved after the outer peripheral surface of the land is pressed against the inner peripheral surface of the valve hole for a long time.

In the electromagnetic valve described in JP 2009-197848 A, meanwhile, the effect of reducing the sliding resistance and the effect of suppressing leakage of working oil between the ports contradict each other, and the amount of leakage of working oil between the ports may be increased when the taper angle is increased to reduce the sliding resistance. Therefore, it may be difficult to reduce the sliding resistance and suppress the amount of leakage of working oil at the same time, depending on the pressure of working oil supplied from the hydraulic pump.

The present disclosure allows a spool to move smoothly even in the case where the spool is moved with respect to a sleeve after the outer peripheral surface of a land of the spool is pressed against the inner peripheral surface of a valve hole of the sleeve for along time.

An aspect of the present disclosure provides an electromagnetic valve. The electromagnetic valve includes a tubular sleeve that has a valve hole at a central portion of the tubular sleeve, a spool, and an electromagnetic solenoid. The tubular sleeve has a plurality of ports penetrating the tubular sleeve between inner and outer peripheral surfaces of the tubular sleeve and disposed side by side in a central axis direction of the valve hole. In the spool, a plurality of lands having an outer peripheral surface that faces an inner peripheral surface of the valve hole is provided side by side in the central axis direction. The spool is disposed so as to be slidable in the valve hole, and configured to slide so as to control communication among the ports using the lands. The electromagnetic solenoid is configured to move the spool in the central axis direction in the valve hole. The ports have a supply port to which working oil is supplied. The electromagnetic valve has one or a plurality of recessed portions in which the working oil is stored. The one or plurality of recessed portions is formed in either an outer peripheral surface of at least one of the lands or the inner peripheral surface of the valve hole that faces the outer peripheral surface. When the spool is decentered with respect to the tubular sleeve by a pressure of working oil supplied to the supply port, a pressure of the working oil which is stored in the one recessed portion or at least one of the plurality of recessed portions is increased by such decentering.

The configuration described above enables a spool to move smoothly even in the case where the spool is moved with respect to a sleeve after the outer peripheral surface of a land of the spool is pressed against the inner peripheral surface of a valve hole of the sleeve for a long time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a cross-sectional view of a part of a sleeve, the spool, and the valve body taken along the line in FIG. 1, illustrating a state in which the sleeve and the spool are concentric with each other;

FIG. 3B is a cross-sectional view of a part of the sleeve, the spool, and the valve body taken along the line in FIG. 1, illustrating a state in which the spool is decentered with respect to the sleeve;

DETAILED DESCRIPTION OF EMBODIMENTS

First Embodiment

An embodiment of the present disclosure will be described with reference to FIGS. 1 to 3A and 3B. The embodiments described below are provided as suitable specific examples for carrying out the present disclosure, and include portions that specifically implement a variety of technical matters that are technically preferable. However, the technical scope of the present disclosure is not limited to such a specific aspect.

Figure 1:
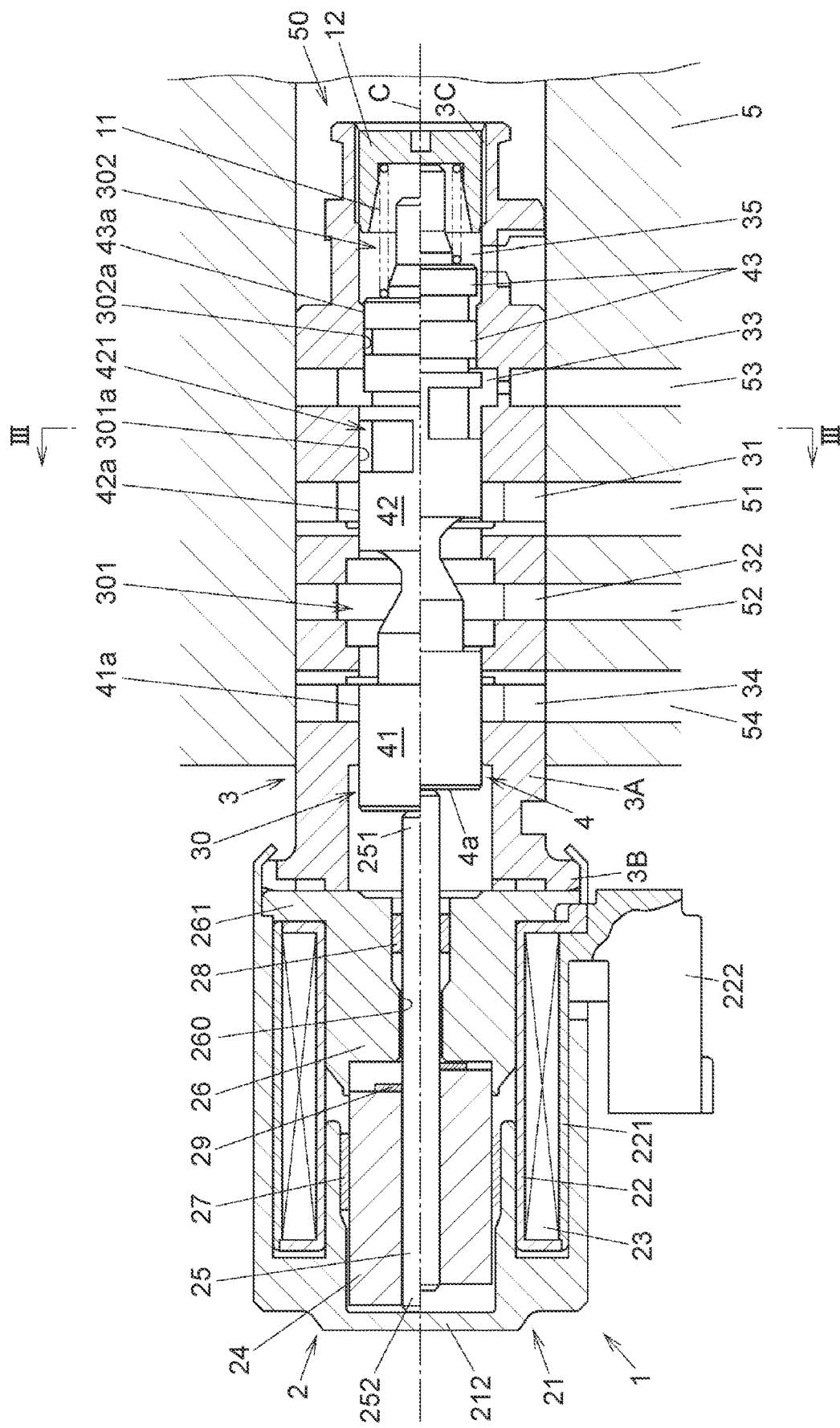
FIG. 1 is a sectional view illustrating the configuration of an electromagnetic valve, together with a valve body, according to a first embodiment of the present disclosure.

FIG. 1 is a sectional view illustrating the configuration of an electromagnetic valve, together with a valve body, according to a first embodiment of the present disclosure. An electromagnetic valve 1 includes: an electromagnetic solenoid 2; a tubular sleeve 3 provided with a valve hole 30 at the central portion of the tubular sleeve; a spool 4 disposed so as to be movable in the valve hole 30; a return spring 11 that serves as a biasing member that biases the spool 4 toward the electromagnetic solenoid 2; and a plug body 12 that blocks an end portion of the sleeve 3. The electromagnetic valve 1 is used to control a hydraulic actuator of a transmission of an automobile, for example.

The electromagnetic solenoid 2 is actuated upon receiving supply of an excitation current, and moves the spool 4 in the axial direction along a central axis C of the valve hole 30. In the present embodiment, the electromagnetic solenoid 2 presses the spool 4 toward the return spring 11 with a pressing force that matches the magnitude of the excitation current. In FIG. 1, a state in which the excitation current is zero is illustrated on the upper side with respect to the central axis C of the valve hole 30, and a state in which the excitation current at a rated value is supplied is illustrated on the lower side with respect to the central axis C.

As illustrated in FIG. 1, the electromagnetic valve 1 is used with the sleeve 3 fitted in a fitting hole 50 formed in a valve body 5. The valve body 5 is formed with: a supply passage 51 through which working oil is supplied into the sleeve 3; an output passage 52 through which working oil is led to a hydraulic pressure supply target such as a hydraulic actuator; a feedback passage 53 that communicates with the output passage 52; and a drain passage 54 through which extra working oil is led to a drain tank (not illustrated). Working oil discharged from a hydraulic pump (not illustrated) is supplied to the supply passage 51.

The sleeve 3 has a cylindrical body portion 3A and a rib portion 3B. The rib portion 3B abuts against a flange portion 261 of a solenoid core 26, to be discussed later, to be attached to the electromagnetic solenoid 2. The sleeve 3 includes: a supply port 31 which communicates with the supply passage 51 and through which working oil is supplied to the valve hole 30; an output port 32 that communicates with the output passage 52; a feedback port 33 that communicates with the feedback passage 53; a drain port 34 that communicates with the drain passage 54; and a spring housing space 35 that communicates with the fitting hole 50. Such components are formed to penetrate the body portion 3A between the inner and outer peripheral surfaces of the body portion 3A.

Threads 3C are formed on the inner surface of an end portion of the body portion 3A of the sleeve 3 on the opposite side of the rib portion 3B. The plug body 12 is screwed and fixed to the threads 3C. The return spring 11 is a coil spring, for example, and is housed in the spring housing space 35 in the state of being compressed in the axial direction between the plug body 12 and the spool 4.

The valve hole 30 includes a first hole portion 301 on the side of the rib portion 3B with respect to the feedback port 33, and a second hole portion 302 on the side of the plug body 12 with respect to the feedback port 33. The valve hole 30 is formed such that the inside diameter of the first hole portion 301 is larger than the inside diameter of the second hole portion 302. The ports (supply port 31, output port 32, feedback port 33, and drain port 34) are formed side by side along the central axis C at predetermined intervals. The supply port 31, the output port 32, and the drain port 34 communicate with the first hole portion 301. The feedback port 33 opens at the boundary between the first hole portion 301 and the second hole portion 302.

The spool 4 is formed with first to third lands 41 to 43 in a circular column shape arranged from the side of the rib portion 3B toward the side of the plug body 12. The first to third lands 41 to 43 are formed side by side at predetermined intervals along the axial direction of the spool 4. The outside diameter of the first land 41 and the outside diameter of the second land 42 are equal to each other. The outside diameter of the third land 43 is smaller than the outside diameter of the first and second lands 41 and 42. The difference in the outside diameter between the second land 42 and the third land 43 causes a difference in the pressure receiving area for a feedback pressure of working oil supplied to the feedback port 33. The difference in the pressure receiving area generates a pressing force that presses the spool 4 toward the electromagnetic solenoid 2.

The spool 4 is disposed so as to be slidable in the valve hole 30. The spool 4 slides in the valve hole 30 to control communication between the ports 31 to 34 with the first to third lands 41 to 43. The first land 41 can block and allow communication between the output port 32 and the drain port 34. The second land 42 can block and allow communication between the supply port 31 and the output port 32, and blocks communication between the supply port 31 and the feedback port 33. The third land 43 blocks communication between the feedback port 33 and the spring housing space 35. The term "block" as used herein refers to substantially blocking a flow of working oil except for slight leakage of working oil.

The outside diameter of the first and second lands 41 and 42 is slightly smaller than the inside diameter of the first hole portion 301 of the valve hole 30. The outside diameter of the third land 43 is slightly smaller than the inside diameter of the second hole portion 302 of the valve hole 30. The difference between the outside diameter of the first and second lands 41 and 42 and the inside diameter of the first hole portion 301 and the difference between the outside diameter of the third land 43 and the inside diameter of the second hole portion 302 are determined to demonstrate the effect as a seal portion that blocks leakage of working oil, and specifically have a dimension of 20 μm to 30 μm, for example. Respective outer peripheral surfaces 41*a* and 42*a* of the first and second lands 41 and 42 face an inner peripheral surface 301*a* of the first hole portion 301 of the valve hole 30 via a slight clearance. An outer peripheral surface 43*a* of the third land 43 faces an inner peripheral surface 302*a* of the second hole portion 302 via a slight clearance.

The first land 41 varies the area of a flow path between the output port 32 and the drain port 34 in accordance with axial movement of the spool 4. The second land 42 varies the area of a flow path between the supply port 31 and the output port 32 in accordance with axial movement of the spool 4. Consequently, the pressure of working oil output from the output port 32 is varied in accordance with the position of the spool 4.

The electromagnetic solenoid 2 has: a solenoid case 21 fixed to the sleeve 3; a bobbin 22 held on the solenoid case 21; an electromagnetic coil 23 wound around the bobbin 22; a cylindrical plunger 24 that receives magnetic flux generated by the electromagnetic coil 23 to move in the axial direction with respect to the solenoid case 21; a shaft 25 that moves in the axial direction together with the plunger 24 to press the spool 4; the solenoid core 26 which has an insertion hole 260 for insertion of the shaft 25 and which is disposed inside the solenoid case 21; a cylindrical first bush 27 that guides axial movement of the plunger 24 with respect to the solenoid case 21; a cylindrical second bush 28 that guides axial movement of the shaft 25 with respect to the solenoid core 26; and a ring-shaped stopper 29 externally fitted with the shaft 25.

The outer periphery of the electromagnetic coil 23 is covered by a molded resin portion 221 integrated with the bobbin 22. The molded resin portion 221 is provided with a connector portion 222 exposed to the outside of the solenoid case 21. An excitation current is supplied from a control device (not illustrated) to the electromagnetic coil 23 via a connector pin (not illustrated) built in the connector portion 222.

The plunger 24 moves in the axial direction in accordance with the excitation current which is supplied to the electromagnetic coil 23. More specifically, the plunger 24 is positioned at a position at which a magnetic force generated by energizing the electromagnetic coil 23 and a force received from the spool 4, which is biased by the return spring 11, via the shaft 25 match each other. The shaft 25 moves in the axial direction together with the spool 4 with a distal end portion 251 of the shaft 25 abutting against an axial end surface 4*a* of the spool 4. The spool 4 is not restrained from rotating with respect to the sleeve 3 or the shaft 25.

In a state in which the electromagnetic valve 1 is not actuated with no excitation current supplied to the electromagnetic coil 23, the shaft 25 receives a biasing force of the return spring 11 via the spool 4, and a rear end portion 252 of the shaft 25 abuts against a bottom portion 212 of the solenoid case 21. At this time, communication between the supply port 31 and the output port 32 is blocked by the second land 42, and the output port 32 communicates with the drain port 34. When an excitation current is supplied to the electromagnetic coil 23, on the other hand, the spool 4 moves toward the plug body 12, which allows communication between the supply port 31 and the output port 32 and blocks communication between the output port 32 and the drain port 34 using the first land 41.

Figure 2:
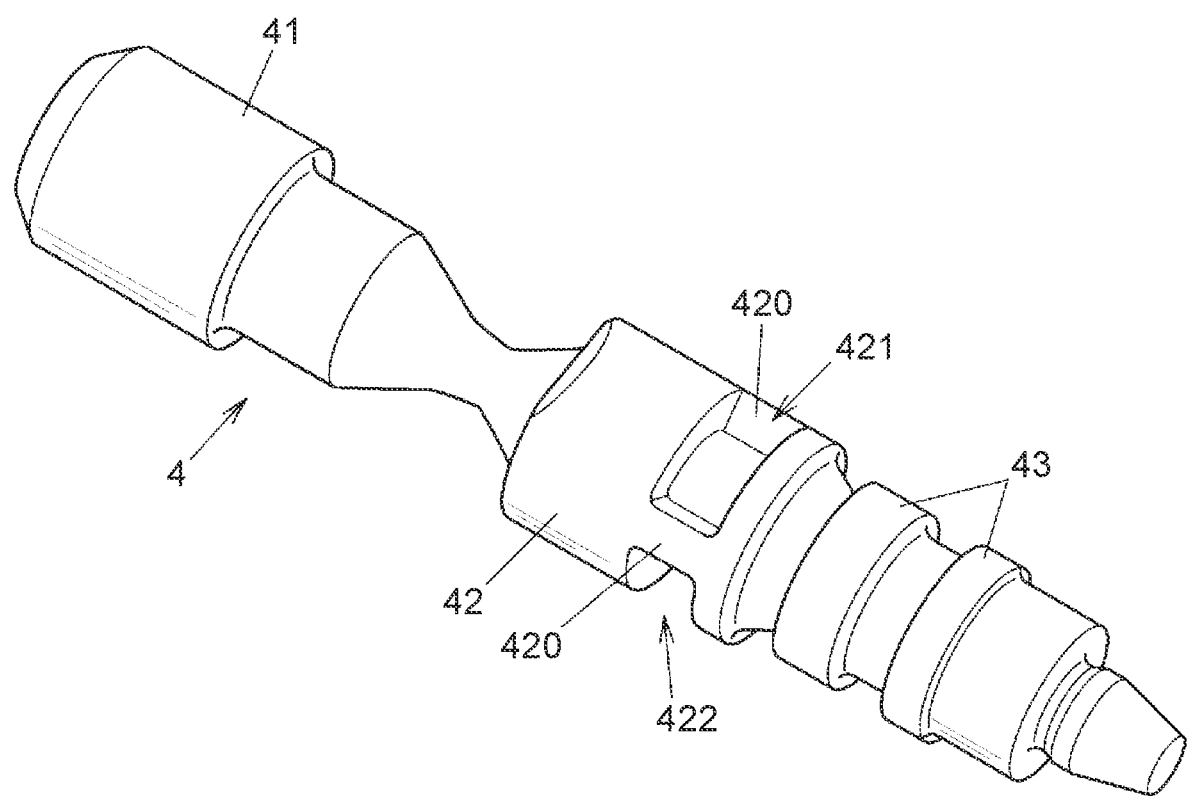
FIG. 2 illustrates the appearance of a spool.

FIG. 2 illustrates the appearance of the spool 4. FIGS. 3A and 3B are each a cross-sectional view of a part of the sleeve 3, the spool 4, and the valve body 5 taken along the line in FIG. 1. FIG. 3A illustrates a state in which the sleeve 3 and the spool 4 are concentric with each other. FIG. 3B illustrates a state in which the spool 4 is decentered with respect to the sleeve 3. In FIGS. 3A and 3B, for clarity of description, the difference between the inside diameter of the sleeve 3 and the outside diameter of the second land 42 of the spool 4 is illustrated as exaggerated.

In the present embodiment, first to third recessed portions 421 to 423 in which working oil is stored are formed in the outer peripheral surface 42*a* of the second land 42. The first to third recessed portions 421 to 423 are formed side by side along the circumferential direction of the second land 42, and dented in the radial direction which is perpendicular to the central axis C from the outer peripheral surface 42*a*. The first to third recessed portions 421 to 423 are partitioned by partition walls 420.

The first to third recessed portions 421 to 423 do not communicate with the supply port 31 even when the spool 4 is moved in the axial direction. In the present embodiment, the first to third recessed portions 421 to 423 communicate with the feedback port 33 when the spool 4 is moved toward the plug body 12. However, the first to third recessed portions 421 to 423 may be formed at positions at which the first to third recessed portions 421 to 423 do not communicate with the feedback port 33 even when the spool 4 is moved toward the plug body 12.

The width of the partition walls 420 in the circumferential direction of the outer peripheral surface 42*a* of the second land 42 is 1 mm to 2 mm, for example. The respective opening widths of the first to third recessed portions 421 to 423 in the circumferential direction of the second land 42 are equal to each other. The first to third recessed portions 421 to 423 are formed at equal intervals in the circumferential direction. The diameter of the second land 42 is 15 mm, for example.

In the examples illustrated in FIGS. 3A and 3B, the partition wall 420 between the second recessed portion 422 and the third recessed portion 423 is positioned on the side of the supply passage 51, and the first recessed portion 421 is positioned on the opposite side of the supply passage 51. When communication between the supply port 31 and the output port 32 is blocked by the second land 42 with the excitation current for the electromagnetic coil 23 becoming zero in the positional relationship described above and the hydraulic pump is continuously actuated, the spool 4 is decentered in the direction away from the supply passage 51 by the pressure of working oil supplied to the supply port 31. As illustrated in FIG. 3B, the outer peripheral surface 42*a* of a portion of the second land 42 around the first recessed portion 421 is pressed against the inner peripheral surface 301*a* of the first hole portion 301 of the sleeve 3 on the opposite side of the supply passage 51.

When the spool 4 is decentered with respect to the sleeve 3 in this manner, the pressure of working oil stored in the first recessed portion 421 is increased by such decentering. This increase in the pressure of working oil in the first recessed portion 421 acts to suppress the decentering of the spool 4 with respect to the sleeve 3. That is, when the spool 4 is decentered with respect to the sleeve 3, a force that suppresses the decentering of the spool 4 is generated, which inhibits sticking between the spool 4 and the sleeve 3.

As discussed earlier, the difference between the outside diameter of the second land 42 and the inside diameter of the first hole portion 301 is slight, and the clearance between the outer peripheral surface 42a of a portion around the first recessed portion 421 and the inner peripheral surface 301a of the first hole portion 301 is further reduced when the spool 4 is decentered in the direction away from the supply passage 51. Therefore, working oil in the first recessed portion 421 is enclosed with the pressure of working oil increased, and continuously generates a force that suppresses the decentering of the spool 4. When an excitation current is supplied to the electromagnetic coil 23, the spool 4 starts moving smoothly with respect to the sleeve 3.

Functions and Effects of First Embodiment

In the first embodiment of the present disclosure described above, when the spool 4 is decentered with respect to the sleeve 3, the pressure of working oil in the first recessed portion 421 is increased to suppress further decentering of the spool 4. This inhibits sticking between the spool 4 and the sleeve 3, and enables the spool 4 to move smoothly even in the case where the spool 4 is moved with respect to the sleeve 3 after the outer peripheral surface 42a of the second land 42 is pressed against the inner peripheral surface 301a of the first hole portion 301 for a long time. Consequently, the occurrence of a stick-slip phenomenon of the spool 4 is suppressed, which enhances the response and the stability of a hydraulic pressure output from the output port 32 with respect to the excitation current for the electromagnetic coil 23.

In the first embodiment, in addition, the first to third recessed portions 421 to 423 are formed side by side along the circumferential direction in the outer peripheral surface 42a of the second land 42. Thus, any of the first to third recessed portions 421 to 423 is positioned on the opposite side of the supply passage 51 even when the spool 4 is turned with respect to the sleeve 3, and a force that suppresses the decentering of the spool 4 can be generated by the recessed portion.

Modifications of First Embodiment

In the first embodiment described above, the first to third recessed portions 421 to 423 are formed at equal intervals in the circumferential direction. However, it is only necessary that a plurality of recessed portions should be provided, and the number of the recessed portions may be two or four or more, for example. In the first embodiment described above, the spool 4 is not restrained from rotating with respect to the sleeve 3. However, the spool 4 may be restrained from rotating with respect to the sleeve 3. In this case, the same functions and effects as those described above can be achieved when one recessed portion is formed to open at a position on the opposite side of the supply passage 51 and not to face the supply passage 51. More specifically, in the first embodiment, the spool 4 may be restrained from rotating with respect to the sleeve 3 at the position illustrated in FIGS. 3A and 3B, and the second recessed portion 422 and the third recessed portion 423 may be omitted.

In the first embodiment described above, the first to third recessed portions 421 to 423 are formed in a portion between the supply port 31 and the feedback port 33 and facing the inner peripheral surface 301a of the first hole portion 301. However, the present disclosure is not limited thereto. A plurality of recessed portions corresponding to the first to third recessed portions 421 to 423 may be formed in a portion between the supply port 31 and the output port 32 and facing the inner peripheral surface 301a of the first hole portion 301. That is, it is only necessary that recessed portions that generate, when the spool 4 is decentered, a force that suppresses further decentering of the spool 4 should be formed at a position between the supply port 31 and a different port that is adjacent to the supply port 31 and facing the inner peripheral surface of the valve hole 30.

Furthermore, recessed portions that generate a force that suppresses the decentering of the spool 4 may be formed in the first land 41 or the third land 43. In this case, it is desirable that recessed portions should be provided in both the first land 41 and the third land 43 in order to suppress tilt of the spool 4 with respect to the central axis C of the valve hole 30.

Second Embodiment

Figure 4A:
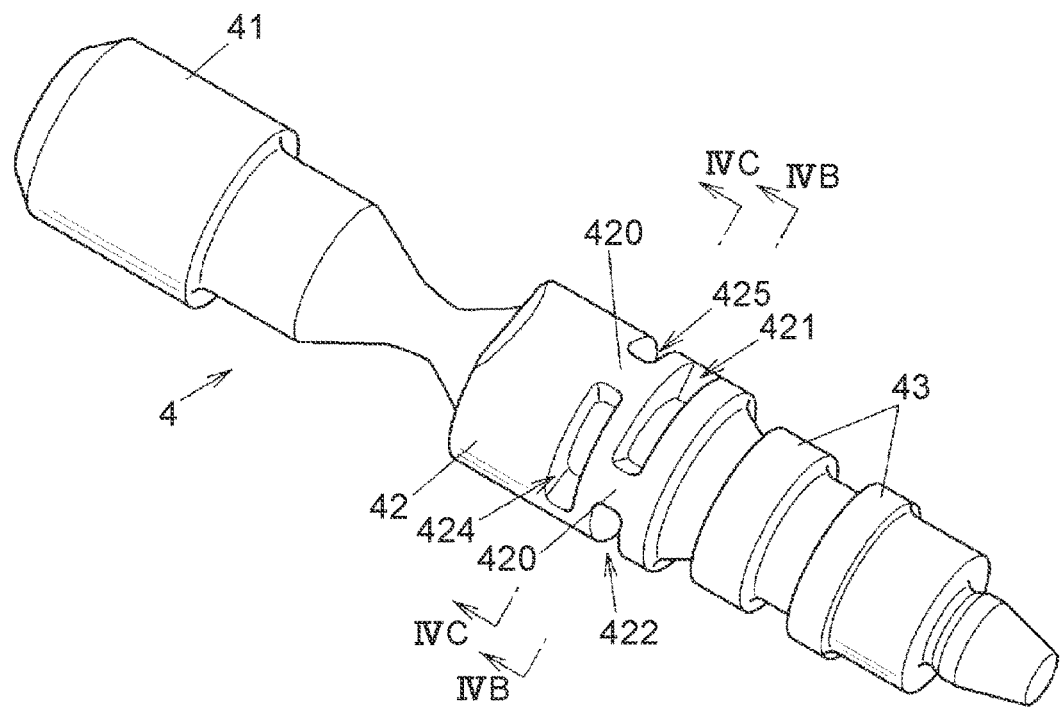
FIG. 4A illustrates the appearance of a spool according to a second embodiment.
Figure 4B:
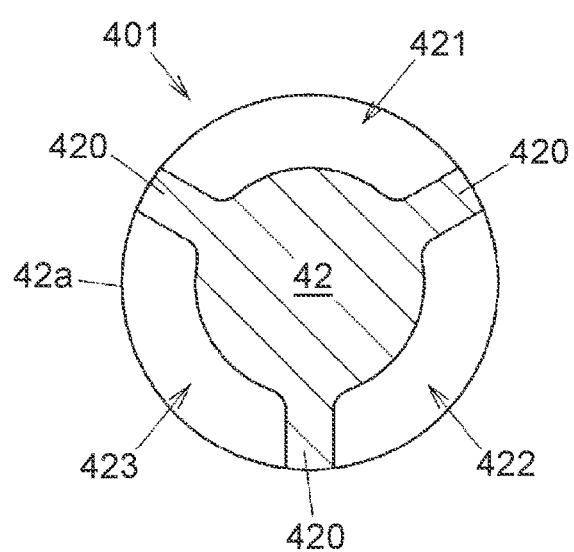
FIG. 4B is a cross-sectional view of the spool taken along the line IVB-IVB in FIG. 4A.
Figure 4C:
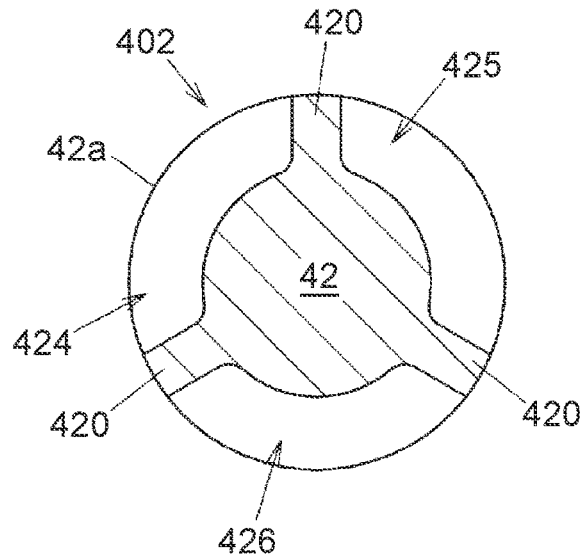
FIG. 4C is a cross-sectional view of the spool taken along the line IVC-IVC in FIG. 4A.

Next, a second embodiment of the present disclosure will be described with reference to FIGS. 4A, 4B, and 4C. FIG. 4A illustrates the appearance of the spool 4 according to the second embodiment. FIG. 4B is a cross-sectional view taken along the line IVB-IVB in FIG. 4A. FIG. 4C is a cross-sectional view taken along the line IVC-IVC in FIG. 4A.

The second embodiment is different from the first embodiment in the shape of the second land 42 of the spool 4, and is otherwise the same as the first embodiment. Thus, the different portion will be mainly described. In FIGS. 4A, 4B, and 4C, portions that are common to the first embodiment are given the same reference numerals as those given in FIG. 2 etc. to omit redundant description.

While the spool 4 according to the second embodiment has first to third recessed portions 421 to 423 as in the first embodiment, the width of the first to third recessed portions 421 to 423 along the axial direction of the spool 4 is smaller than that according to the first embodiment. The spool 4 according to the second embodiment also has fourth to sixth recessed portions 424 to 426, in addition to the first to third recessed portions 421 to 423. That is, in the second embodiment, the first to sixth recessed portions 421 to 426 are formed side by side along the circumferential direction in a first row 401 (illustrated in FIG. 4B) and a second row 402 (illustrated in FIG. 4C) which are parallel along the axial direction.

The fourth to sixth recessed portions 424 to 426 which constitute the second row 402 are partitioned by partition walls 420, as with the first to third recessed portions 421 to 423 which constitute the first row 401. The plurality of partition walls 420 in the first row 401 and the plurality of partition walls 420 in the second row 402 are formed so as not to be positioned at the same position in the circumferential direction, or in other words so as not to be arranged side by side in the axial direction.

In the spool 4 according to the second embodiment, the partition walls 420 in the second row 402 are not arranged side by side in the axial direction with the partition walls 420 in the first row 401 even in the case where the partition walls 420 in the first row 401 are positioned on the opposite side of the supply passage 51. Thus, when the spool 4 is decentered, the pressure of working oil in any of the fourth to sixth recessed portions 424 to 426 in the second row 402 is increased, which suppresses the decentering of the spool 4. The same also applies to the case where the partition walls 420 in the second row 402 are positioned on the opposite side of the supply passage 51. Consequently, the effect of suppressing the decentering of the spool 4 can be achieved more reliably.

Third Embodiment

Figure 5A:
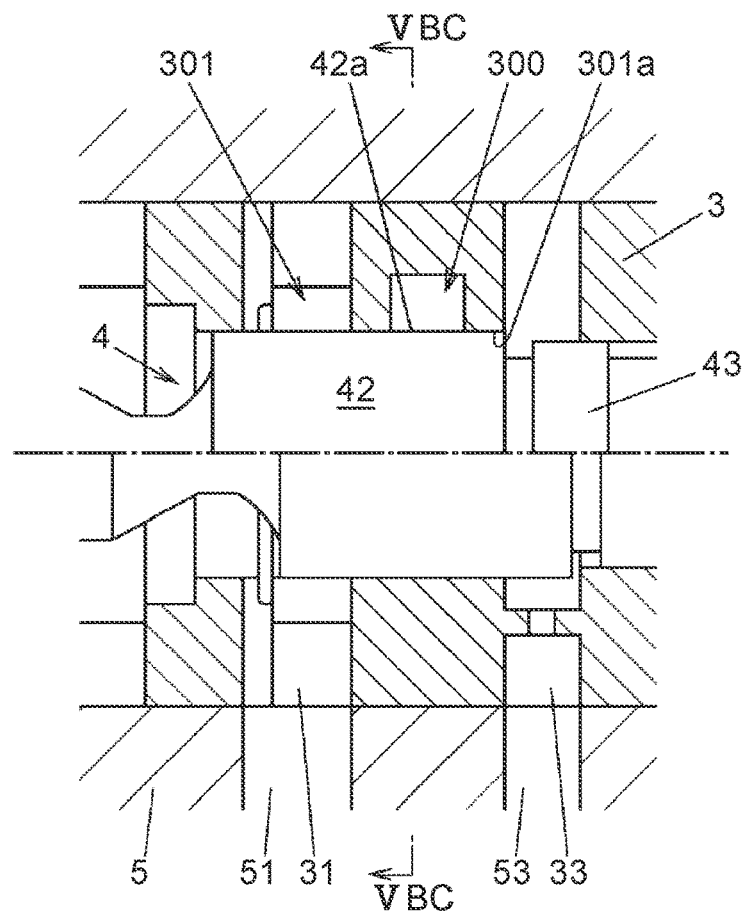
FIG. 5A is a sectional view illustrating a part of a sleeve, a spool, and a valve body according to a third embodiment.
Figures 5B, 5C:
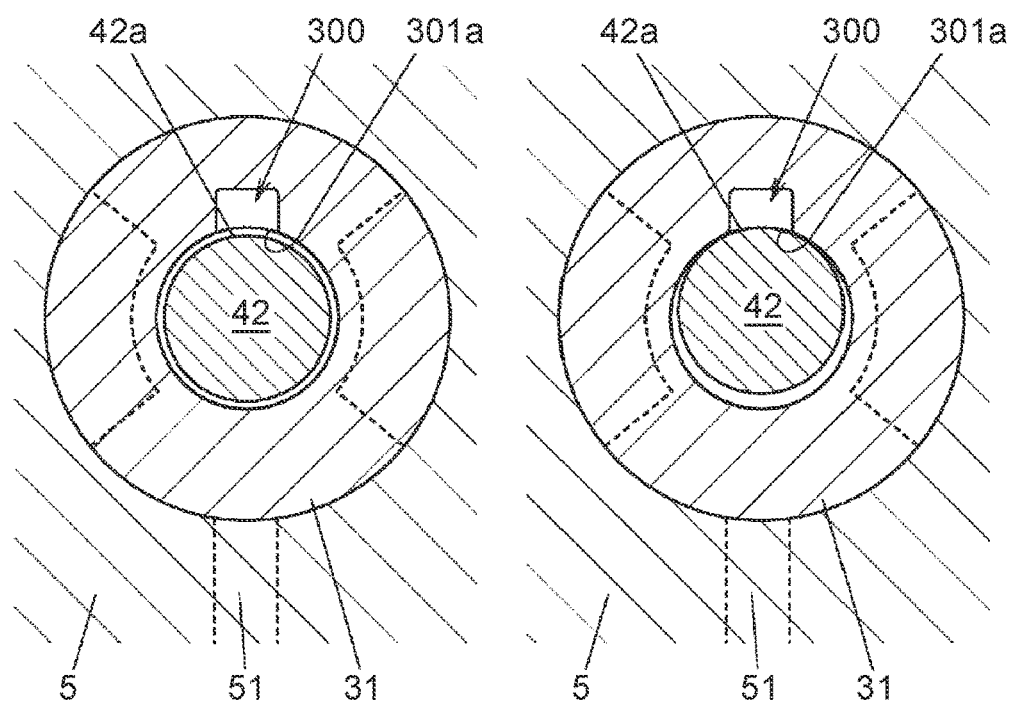
FIG. 5B is a cross-sectional view of the sleeve, the spool, and the valve body taken along the line VBC-VBC in FIG. 5A, illustrating a state in which the sleeve and the spool are concentric with each other.
FIG. 5C is a cross-sectional view of the sleeve, the spool, and the valve body taken along the line VBC-VBC in FIG. 5A, illustrating a state in which the spool is decentered with respect to the sleeve.

Next, a third embodiment of the present disclosure will be described with reference to FIGS. 5A, 5B, and 5C. In the first and second embodiments, a plurality of recessed portions is formed in the spool 4. In the third embodiment, however, a recessed portion 300 is formed in the sleeve 3, and the recessed portion 300 suppresses the decentering of a spool 4 with respect to the sleeve 3. In FIGS. 5A, 5B, and 5C, portions that are common to the first embodiment are given the same reference numerals as those given in FIG. 2 etc. to omit redundant description.

FIG. 5A is a sectional view illustrating a part of the sleeve 3, the spool 4, and the valve body 5 according to the third embodiment. FIGS. 5B and 5C are each a cross-sectional view of the sleeve 3, the spool 4, and the valve body 5 taken along the line VBC-VBC in FIG. 5A. FIG. 5B illustrates a state in which the sleeve 3 and the spool 4 are concentric with each other. FIG. 5C illustrates a state in which the spool 4 is decentered with respect to the sleeve 3. In FIGS. 5B and 5C, for clarity of description, the difference between the inside diameter of the sleeve 3 and the outside diameter of the second land 42 of the spool 4 is illustrated as exaggerated.

In the present embodiment, when the spool 4 is decentered in the direction away from the supply passage 51 by the pressure of working oil supplied to the supply port 31, the pressure of working oil in the recessed portion 300 is increased, which suppresses further decentering of the spool 4. The recessed portion 300 is formed in the inner peripheral surface 301a of the first hole portion 301 of the sleeve 3 at a circumferential position on the opposite side of the supply passage 51, and dented in the radial direction which is perpendicular to the central axis C.

In the present embodiment, by way of example, the recessed portion 300 is formed in the inner peripheral surface 301a of the first hole portion 301 of the valve hole 30 between the supply port 31 and the feedback port 33. However, a similar recessed portion may be formed at a different location such as the inner peripheral surface of the valve hole 30 between the supply port 31 and the output port 32, for example.

Also with the third embodiment, as with the first embodiment, the spool 4 can be moved smoothly, which can suppress the occurrence of a stick-slip phenomenon of the spool 4. The response and the stability of a hydraulic pressure output from the output port 32 with respect to the excitation current for the electromagnetic coil 23 can be enhanced.

While the present disclosure has been described above based on the embodiments, such embodiments do not limit the disclosure according to the claims. It should be noted that all combinations of the characteristics described in relation to the embodiments are not necessarily essential to address the issue of the disclosure.

The present disclosure can be modified, as appropriate, by omitting some components or adding or replacing components, without departing from the scope and spirit of the present disclosure. The present disclosure may also be implemented by combining, as appropriate, the first to third embodiments and modifications thereof.

What is claimed is:

1. An electromagnetic valve comprising:
a tubular sleeve that has a valve hole at a central portion of the tubular sleeve, the tubular sleeve having a plurality of ports penetrating the tubular sleeve between inner and outer peripheral surfaces of the tubular sleeve and disposed side by side in a central axis direction of the valve hole;
a spool in which a plurality of lands having an outer peripheral surface that faces an inner peripheral surface of the valve hole is provided side by side in the central axis direction, the spool being disposed so as to be slidable in the valve hole and configured to slide so as to control communication among the ports using the lands; and
an electromagnetic solenoid configured to move the spool in the central axis direction in the valve hole, wherein
the ports have a supply port to which working oil is supplied and an output port that outputs the working oil based on the movement of the spool,
the electromagnetic valve has one or a plurality of recessed portions in which the working oil is stored, the one or plurality of recessed portions being outside of a communication path between the supply port and the output port throughout a movable range of the spool, and formed in either an outer peripheral surface of at least one of the lands or the inner peripheral surface of the valve hole that faces the outer peripheral surface, and
when the spool is decentered with respect to the tubular sleeve by a pressure of working oil supplied to the supply port, a pressure of the working oil which is stored in the one recessed portion or at least one of the plurality of recessed portions is increased by such decentering.

2. The electromagnetic valve according to claim 1, wherein the recessed portions are partitioned by partitioning portions and disposed side by side along a circumferential direction in the outer peripheral surface of the at least one of the lands.

3. The electromagnetic valve according to claim 2, wherein the at least one land is configured to block communication between the supply port and a different one of the ports.

4. The electromagnetic valve according to claim 2, wherein the recessed portions are disposed side by side along the circumferential direction in each of a first row and a second row arranged along the central axis direction, and partitioning portions that partition the recessed portions in the first row and partitioning portions that partition the recessed portions in the second row are disposed so as not to be arranged side by side in the central axis direction.

* * * * *